Nov. 4, 1969

R. K. H. GEBEL 3,476,132

COLOR MATCHING SYSTEM INCORPORATING COLOR ANALYZER

Original Filed March 29, 1965

INVENTOR.
R. K. H. GEBEL
BY Harry A. Herbert Jr.
ATTORNEY

James L. Shannon
AGENT

Nov. 4, 1969  R. K. H. GEBEL  3,476,132
COLOR MATCHING SYSTEM INCORPORATING COLOR ANALYZER
Original Filed March 29, 1965  8 Sheets-Sheet 4

INVENTOR.
R.K.H. GEBEL
BY Harry A. Herbert Jr.
ATTORNEY
James S. Shannon
AGENT

INVENTOR.
R. K. H. GEBEL
BY Harry A. Herbert Jr
ATTORNEY
James S. Shannon
AGENT

R. K. H. GEBEL 3,476,132

COLOR MATCHING SYSTEM INCORPORATING COLOR ANALYZER

Original Filed March 29, 1965

Nov. 4, 1969  R. K. H. GEBEL  3,476,132

COLOR MATCHING SYSTEM INCORPORATING COLOR ANALYZER

Original Filed March 29, 1965  8 Sheets-Sheet 8

INVENTOR.
R. K. H. GEBEL
BY Harry A. Herbert Jr
ATTORNEY
James S. Shannon
AGENT

United States Patent Office 3,476,132
Patented Nov. 4, 1969

3,476,132
COLOR MATCHING SYSTEM INCORPORATING COLOR ANALYZER
Radames K. H. Gebel, Dayton, Ohio, assignor to the United States of America as represented by the Secretary of the Air Force
Original application Mar. 29, 1965, Ser. No. 443,722, now Patent No. 3,330,904. Divided and this application Apr. 21, 1967, Ser. No. 634,054
Int. Cl. G01d *11/00;* G01j *3/46*
U.S. Cl. 137—93                        1 Claim

ABSTRACT OF THE DISCLOSURE

A color matching system incorporating a color analyzer which determines the chromaticity of a given color, or the position of the color in the CIE color triangle, in terms of hue and saturation. Paint of the indicated hue is the mixed at a constant rate with white paint at a rate corresponding to the saturation to produce a paint mixture matching the given color.

The invention described herein may be manufactured and used by or for the United States Government for governmental purposes without the payment to me of any royalty thereon.

Cross-reference to related application

This application is a division of my application Serial No. 443,722, filed Mar. 29, 1965, now U.S. Patent 3,330,904.

Background of the invention

The invention pertains to the art of color analysis and color matching. Color matching in paints is usually accomplished by selecting from a catalog of colors, for each of which the mixing formula has previously been determined, the color most nearly like the desired color. The invention obviates the need for a color catalog by directly viewing the color to be matched and provides for closer color gradation since the apparatus may be designed to determine hue and saturation to any degree of accuracy desired.

Summary of the invention

The invention consists in providing apparatus for directly viewing a color to be matched and determining its chromaticity in terms of hue and saturation, and in automatically mixing paint of the indicated hue with white paint at relative rates determined by the saturation to provide any quantity of a matching paint mixture.

Brief description of the drawing

FIG. 3 is a schematic diagram of a ratio computer for use in FIG. 1,
FIGS. 4 and 4A show and explain the CIE color plane,
FIG. 5 shows the tristimulus curves for the eye.

Description of the preferred embodiment

Figures 4A, 5:
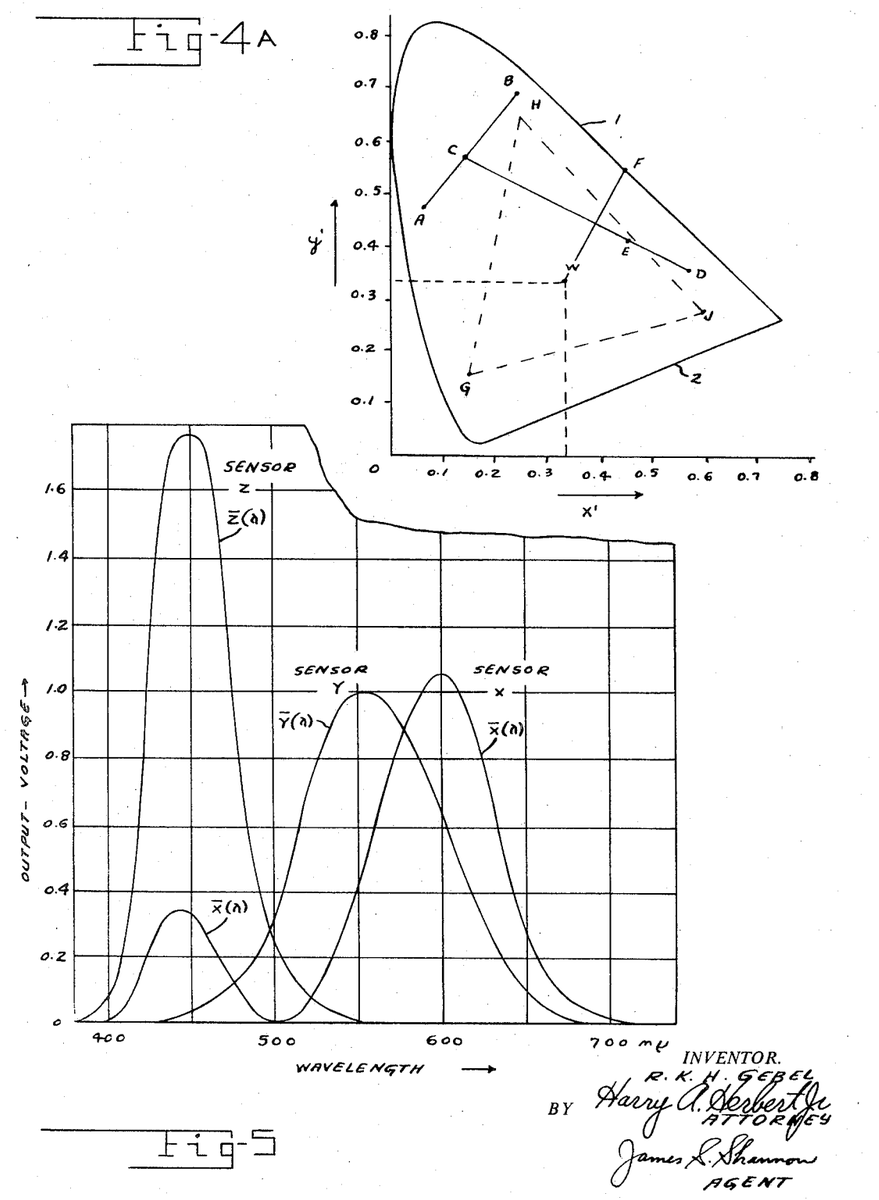

It is known that the color of any luminous surface can be fully defined by three numbers X, Y and Z the values of which are $$X = \int E(\lambda) \bar{X}(\lambda) d\lambda$$
$$Y = \int E(\lambda) \bar{Y}(\lambda) d\lambda$$
$$Z = \int E(\lambda) \bar{Z}(\lambda) d\lambda$$

where $E(\lambda)$ represents the spectral distribution of the light emanating from the surface and the functions $\bar{X}(\lambda)$, $\bar{Y}(\lambda)$ and $\bar{Z}(\lambda)$, called the tristimulus values, represent the spectral sensitivies of the three color sensors which, in accordance with the Young-Helmholtz color theory, are in each individual color sensitive area of the human retina. In tests conducted on a large number of observers the relative values of these functions for the spectrum of constant energy have been determined for the average observer and are shown in FIG. 5.

Changes in the amount of the radiation $E(\lambda)$ received from the luminous surface, i.e. changes in the brightness of the surface, change the absolute but not the relative values of X, Y and Z. Therefore, brightness is a factor in defining color and, in fact, the color sensation produced by light of constant spectral content changes with the radiation intensity or brightness. What does not change with brightness is termed the chromaticity of the color. Chromaticity may be defined by three numbers $x$, $y$ and $z$ having the following values:

$$x = \frac{X}{X+Y+Z}$$
$$y = \frac{Y}{X+Y+Z}$$
$$z = \frac{Z}{X+Y+Z}$$

Figures 3, 4:
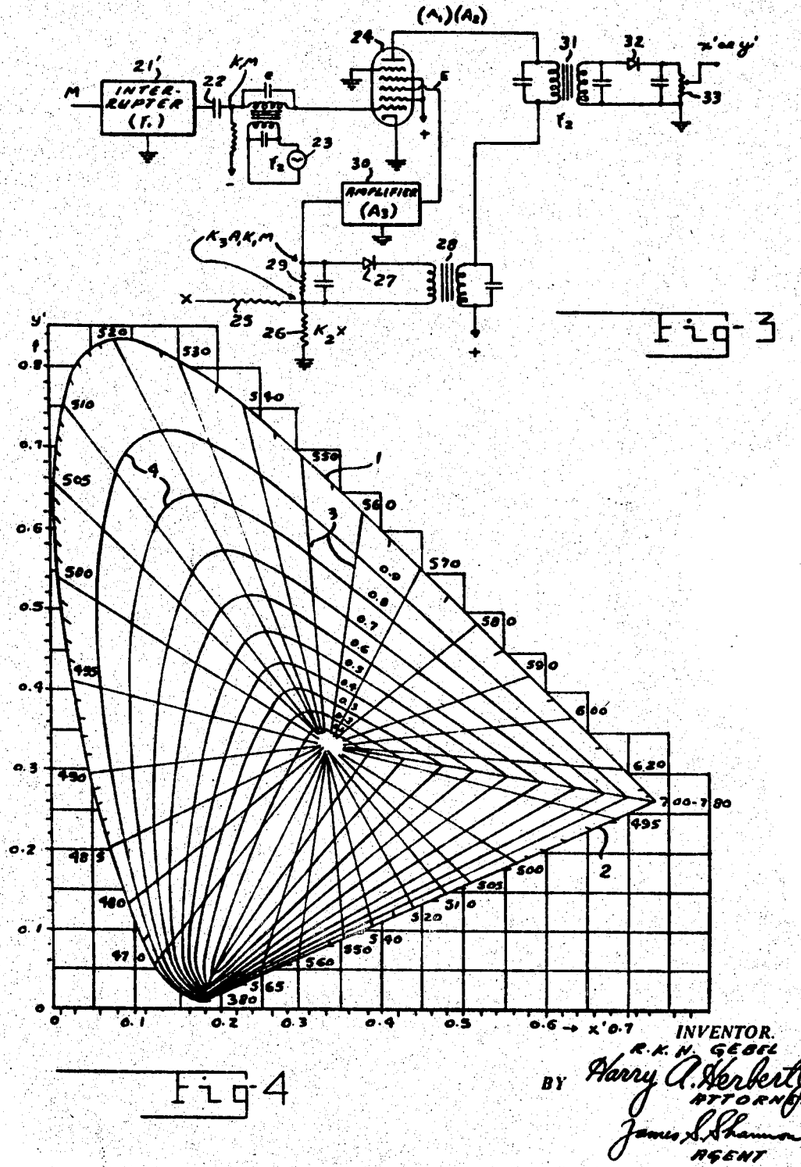

Since $$x+y+z=1$$

it is clear that only two of the above three numbers are required to define a chromaticity, the numbers $x$ and $y$ being normally used. If the values of $x$ and $y$ are plotted with respect to $x$ and $y$ rectangular axes, then it is apparent that all chromaticities lie within a triangle bounded by the lines $x=0$, $y=0$ and $x+y=1$. All chromaticities within this triangle, however, are not realizable. The realizable chromaticities lie within an area in the triangle bounded by the locus of the chromaticities of all the monochromatic radiations in the visible spectrum and a straight line joining the extremities of this locus. The standard CIE color plane derived in the above manner is shown in FIG. 4. The line 1, extending from the point representing the chromaticity of the radiation of wavelength 380 mµ at the extreme violet end of the spectrum to the point representing the chromaticity of the radiation of wavelength 780 mµ at the extreme red end of the spectrum, is the locus of the chromaticities of the visible monochromatic radiations or spectral colors. The straight line 2 joining the extremes of this locus and completing the boundary of the area of realizable chromaticities is the locus of the chromaticities of mixtures of extreme spectral violet and extreme spectral red which constitute the purple colors. The chromaticity for white is at the point $x=0.33$, $y=0.33$. When lights of two different chromaticities are additively mixed the resulting point in the color plane lies on a straight line joining the two chromaticities. Thus, as better seen in FIG. 4A, a mixture of A and B lies at a point such as C on the line joining A and B, the position of C being at the center of gravity of A and B which are assigned weights equal to $X+Y+Z$. If now a color at point D is added to the color at C, the chromaticity moves toward D along a straight line to a point such as E a distance depending upon the amount of D added. Further, if a spectral color such as that at point F is mixed with increasing amounts of W (white) the chromaticity moves along a straight line toward W, the resulting mixture decreasing in saturation or increasing in whiteness as W is approached. Thus, in FIG. 4, lines 3 are termed lines of constant hue or colorimetric purity and lines 4 are termed lines of constant saturation or whiteness. It follows that any chromaticity can be specified in terms of hue and saturation (or degree of whiteness) where hue is a color whose chromaticity lies on the spectral line 1 or the purple line 2. Additive mixtures of any three colors having chromaticities G, H and J (FIG. 4A) can produce any color having a chromaticity lying within the area of the triangle defined by these three points. Because of the curvature in two sides of the area the realizable chromaticities, as shown in FIGS. 4 and 4A, there are no three realizable colors that can produce all of the visible colors; however, by a judicious choice of the three primary colors, a high proportion of the visible colors may be produced by their mixture.

It follows from the foregoing that the color sensation produced in the brain when viewing a luminous surface is determined by the intensity of the light emanating from the surface, i.e. its brightness, and by its chromaticity which, except for the chromaticities lying on the spectral line and the purple line in the color plane, is not spectrally unique. More detailed information on the problem of color and color perception may be found in an article entitled "The Colour Triangle" by W. deGroot and A. A. Kruithof, appearing in the Philips Technical Review, vol. 12, No. 5, November 1950, and in the book entitled The Threshold of Visual Sensation in Comparison with that of Photosensors, Its Quantum Aspect, Problems of Color Perception, and Related Subjects by R. K. H. Gebel available from the Superintendent of Documents, U.S. Government Printing Office.

Figure 1:
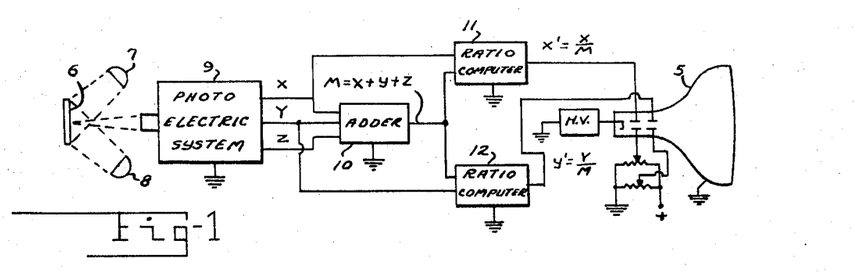
FIG. 1 is a block diagram of apparatus for determining the chromaticity of a color.

The color analyzer shown in FIG. 1 operates to determine the chromaticity of any given color and to position the beam of cathode ray tube 5 so that the spot of light on the screen occupies a position corresponding to the position of the chromaticity of the color in the color triangle. For direct reading of the chromaticity a transparent overlay of the color triangle of FIG. 4 may be provided on the screen of the cathode ray tube. As shown in FIG. 1, the analyzer is used to determine the chromaticity of the light reflected from a colored surface 6 which is illuminated by light from sources 7 and 8. The spectral distribution of sources 7 and 8 should correspond to that of the illumination under which the color of interest is to be normally observed. Light reflected from surface 6 enters photoelectric system 9 which has three sensors the outputs of which are designated X, Y and Z. The sensitivities of these sensors should correspond as nearly as possible to the functions $\overline{X}(\lambda)$, $\overline{Y}(\lambda)$ and $\overline{Z}(\lambda)$ shown in FIG. 5. The outputs X, Y and Z are applied to adder 10 which has an output $M=X+Y+Z$. The outputs X and M are applied to ratio computer 11 which has an output $x'=X/M$ and, similarly, the outputs Y and M are applied to ratio computer 12 which has an output $y'=Y/M$. The outputs $x'$ and $y'$ are the rectangular coordinates of the chromaticity and are applied to the horizontal and vertical deflection circuits, respectively, of cathode ray tube 5. If the screen of tube 5 is provided with an overlay in the form of FIG. 4, as previously stated, the spot of light produced by the beam will indicate the position of the chromaticity in the CIE color triangle, from which the chromaticity may be read in terms of $x'$, $y'$ values or in terms of hue and saturation.

Figure 1A:
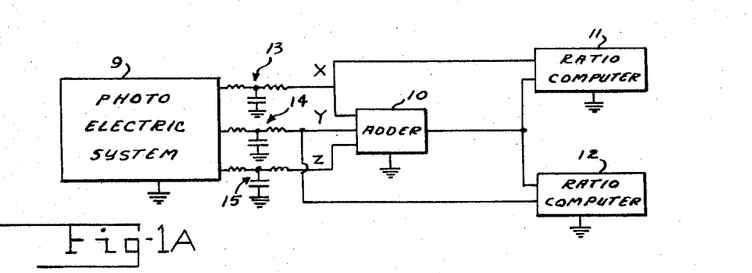
FIG. 1A is a variation of FIG. 1 for simulating the subjective color sensations of the eye.

The apparatus of FIG. 1 constitutes an opto-electrical analogy of the human visual organs in determining chromaticity. As is known, if white light is pulsed at a frequency below the fusion frequency of the eye a sensation of color is produced. This is known as the Prevost-Fechner-Benham subjective color phenomena. It has been assumed that these phenomena are due to transients in the outputs of the three color sensors in the retina. This effect may be simulated in the apparatus of FIG. 1 by inserting in the X, Y and Z outputs, networks 13, 14 and 15 having different time constants. With this arrangement, the X, Y and Z outputs will have different values for pulsed white light than for steady while light with the result that the $x'$, $y'$ chromaticity values change and the chromaticity is displaced from the white point in the color triangle.

Figure 2:
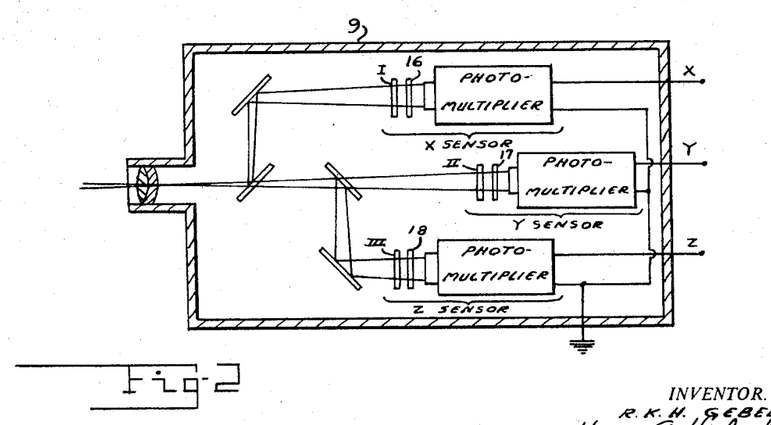
FIG. 2 shows details of the photoelectric system of FIG. 1.
Figure 6:
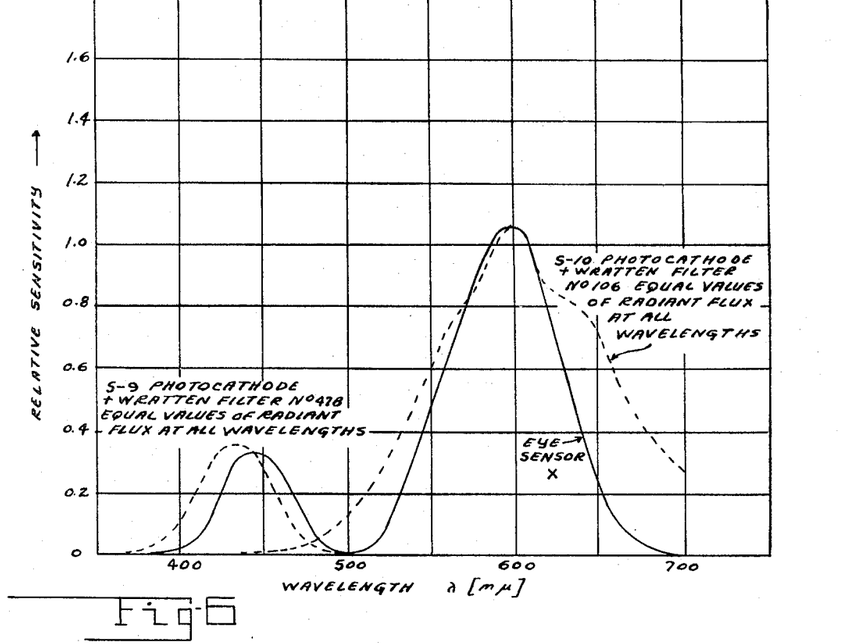
FIGS. 6, 7 and 8 show filter-photocathode combinations for approximating the tristimulus curves of the eye.
Figure 7:
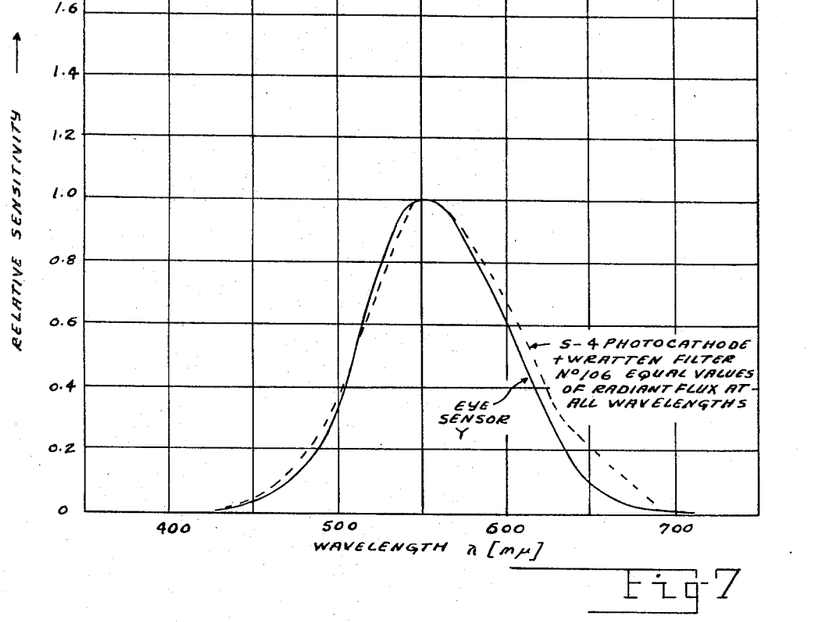
Figure 8:
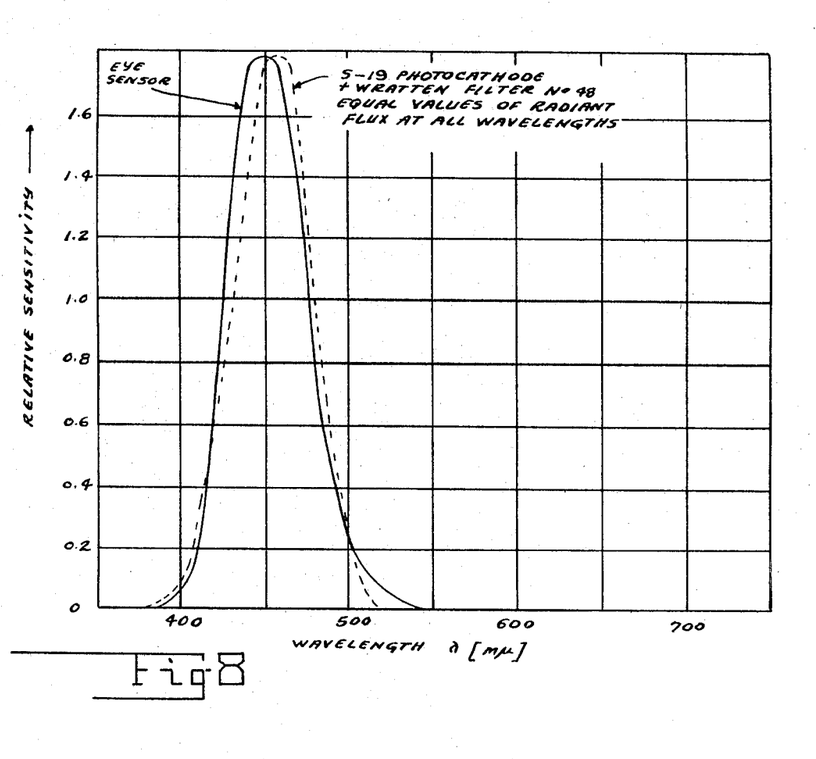

The details of the photoelectric system 9 of FIG. 1 are shown in FIG. 2. The incoming light is split into three comopnents, by a suitable arrangement of partially reflecting and totally reflecting mirrors and directed into the X, Y and Z sensors. The X, Y and Z sensors comprise photomultiplies preceded in each case by a filter I, II or III and a neutral density filter 16, 17 or 18. For determinations relative to the CIE color plane, the X, Y and Z sensors should have relative sensitivities corresponding to the $\overline{X}(\lambda)$, $\overline{Y}(\lambda)$ and the $\overline{Z}(\lambda)$ functions, respectively, of FIG. 5, i.e., to the tristimulus values of the eye. These sensitivities are controlled by the transmission characteristics of filters I, II and III and the spectral responses of the photocathodes of the photomultipliers. FIGS. 6, 7 and 8 give filter-photocathode combinations approximating the desired functions. For FIG. 6 where two different filters and two different photocathodes are required a composite filter and a composite photocathode may be employed. The neutral density filters 16, 17 and 18 serve to establish the correct relative amplitudes of the three functions.

Figures 9, 10:
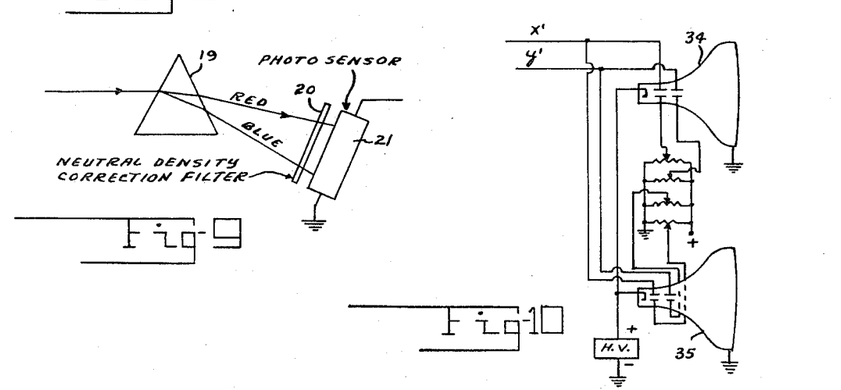
FIG. 9 shows another method for matching the tristimulus curves of the eye.
FIGS. 10, 11 and 12 show modifications of FIG. 1 for determining chromaticity in terms of hue and whiteness.

FIG. 9 illustrates a method for more closely matching the tristimulus values. In this method the light is first dispersed in accordance with wavelength by prism 19 and passed through a neutral density correction filter 20 to the photosensor 21 which may be a photomultiplier as in FIG. 2. Filter 20 controls the amount of each wavelength reaching the photosensor. By properly designing the correction filter, taking into account the spectral response of the photosensor 21, any desired overall characteristic may be obtained.

The ratio computers 11 and 12 in FIG. 1 may be any suitable device for producing a voltage proportional to the ratios indicated. An example is shown in FIG. 3. Referring to this figure, the voltage M is converted by interrupter 21' and capacitor 22 into an alternating voltage $k_1M$ of frequency $f_1$ which is applied along with alternating voltage $e$ of frequency $f_2$, derived from source 23, to the control grid of tube 24 the amplification factor of which may be controlled by varying the direct voltage E on its third grid. The direct voltage X is applied to a potential divider 25–26 producing a voltage $k_2X$ across resistor 26. The output of tube 24 at frequency $f_1$ is coupled to rectifier 27 through transformer 28 tuned to $f_1$. The output of this rectifier, developed across resistor 29, has the value $k_3A_1k_1M$, where $A_1$ is the gain of the tube 24 stage at $f_1$. The difference between the voltages across resistors 26 and 29 is amplified by amplifier 30 having gain $A_3$ to produce the gain control voltage E. The output of tube 24 at frequency $f_2$ is coupled by transformer 31, tuned of to $f_2$ to rectifier 32 which produces the output voltage $x'$ at potentiometer resistor 33.

The principle of operation of the circuit of FIG. 3 is to make the gain of stage 24 proportional to $X/M$ and, since $e$ is constant, $x'$ will then be a constant times the gain or a constant times $X/M$. This may be seen from the following equations:

(1) $\quad E=(k_2X-k_3A_1k_1M)A_3$

Rearranging (1), (2) $$A_1=\frac{k_2X-\dfrac{E}{A_3}}{k_3k_1M}$$

If $A_3$ is made very high, the term $E/A_3$ approaches zero, since E is relatively small, and the expression for $A_1$ becomes (3) $$A_1=\frac{k_2X}{k_3k_1M}$$

Since the gain $A_2$ of stage 24 at $f_2$ is a constant times the gain $A_1$ at $f_1$ (4) $$A_2=\frac{k_4k_2X}{k_3k_1M}$$

(5) $$x'=eA_2k_5=\frac{ek_5k_4k_2X}{k_3k_1M}$$

Since $e$ is a constant, (6) $$x'=K\frac{X}{M}$$

The voltage $y'$ is obtained in a similar manner.

Figure 11:
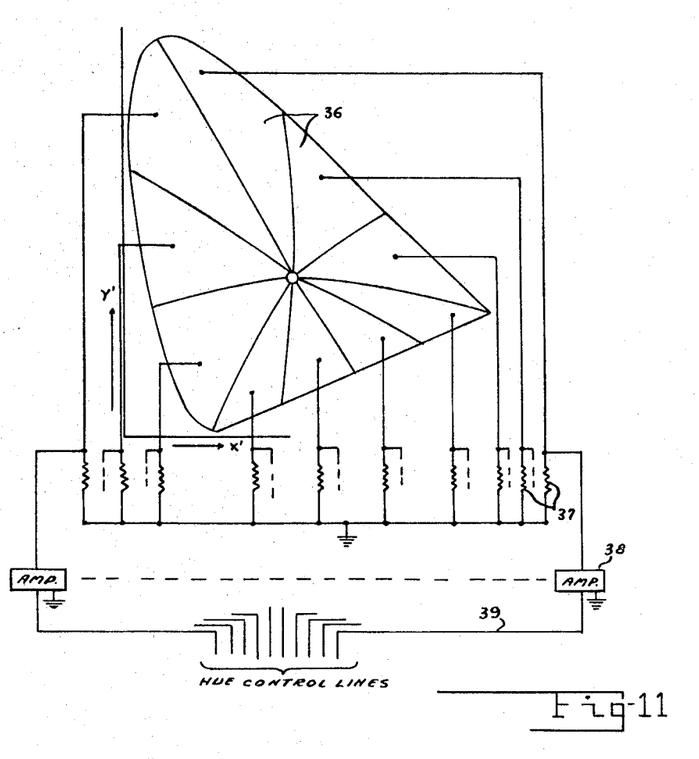
Figures 12, 14:
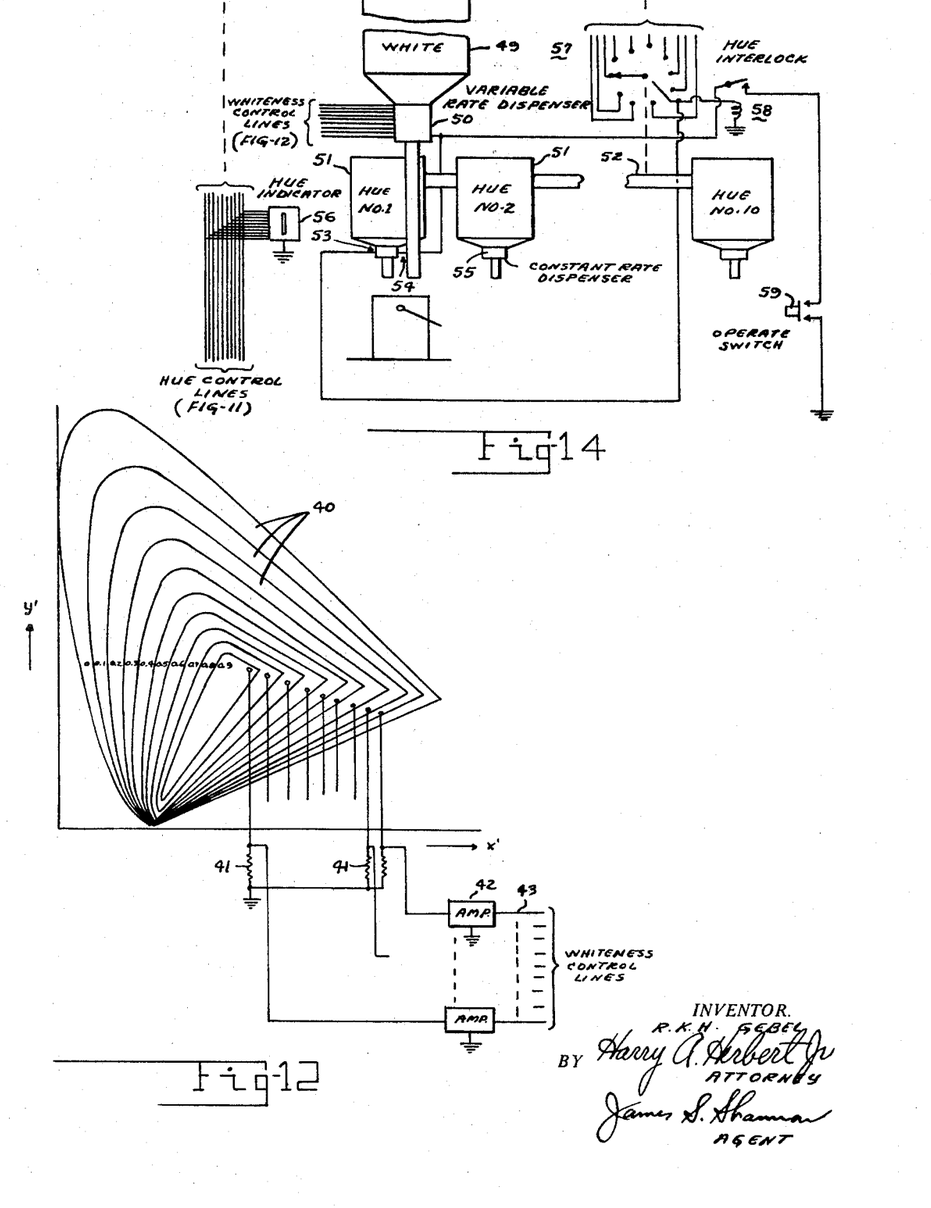
FIG. 14 illustrates with FIGS. 1, 10, 11 and 12 an automatic paint mixer.

FIGS. 10, 11 and 12 illustrated a modification of the chromaticity analyzer of FIG. 1 that indicates chromaticity in terms of hue and whiteness. For this purpose two cathode ray tubes 34 and 35 are required as shown in FIG. 10. Cathode ray tube 34 determines the hue of the analyzed color and for this purpose has on the inner surface of its screen an electrode structure such as shown in FIG. 11. The electrodes in this structure consist of a plurality of electrically separate roughly triangularly shaped electrodes 36 extending in the color plane from the spectral line and the purple line toward the white point. Each of these electrodes corresponds to a hue and is connected to an external circuit and to ground through a resistor 37. Consequently, when the electron beam rests on any particular electrode the beam current flowing in the resistor 37 produces a voltage thereacross which may be amplified in amplifier 38 and applied to control line 39, each control line representing a particular hue. The electrodes 36 may be metallic films formed on the inner surface of the cathode ray tube screen by any of the known processes for accomplishing this.

Cathode ray tube 35 determines the whiteness of the analyzed color and for this purpose has on the inner surface of its screen the electrode structure shown in FIG. 12. In this case the structure comprises a plurality of electrically separate electrodes 40, ten in the example shown, the boundaries of which correspond to lines of constant whiteness or saturation as shown in FIG. 4. Each electrode is connected to ground through an external circuit including a load resistor 41. Consequently, when the beam rests on any particular electrode the beam current flowing through the corresponding load resistor 41 produces a voltage thereacross which may be amplified in an amplifier 42 and applied to a control line 43, each control line corresponding to a degree of whiteness.

Figure 13:
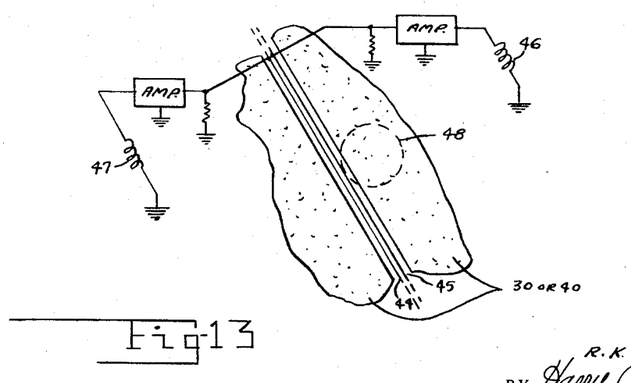
FIG. 13 shows a method of insuring that the electron beam falls on only one electrode in FIGS. 11 and 12.

In order to prevent the electron beam from impinging on more than one electrode in FIGS. 11 and 12, the technique illustrated in FIG. 13 may be used. The space between adjacent electrodes 36 or 40 is provided with two small parallel wires or other conductors 44 and 45. These conductors are coupled through amplifiers to small deflection coils 46 and 47 on the cathode ray tube. As the beam 48 spills over the edge of an electrode and touches the adjacent conductor current flows in the deflecting coil. The alignment of the coil and the direction of the current flow are made such as to oppose any further movement of the beam toward the conductor. With sufficient amplifier gain, the beam is restrained to a position that barely touches the conductor, as illustrated. In this manner the beam is prevented from impinging on both electrodes by being deflected toward the electrode adjacent to the conductor drawing the greater beam current. Several systems of this type are required to protect all edges of the electrodes in FIGS. 11 and 12 because of their different directions.

FIG. 14 together with FIG. 1 as modified in FIGS. 10, 11 and 12 constitute an automatic paint mixer capable of viewing a particular color under normal lighting conditions and mixing a paint that will match the color. The apparatus in FIG. 14 comprises a stationary container 49 for white paint having an outlet through an electrically actuated variable rate dispenser 50 controlled by the whiteness control lines from FIG. 12. There is also a container 51 for each of the hues which, in the example shown, are ten in number. The hue containers may be mounted on a movable structure 52, such as a turret, so that the proper hue may be brought into position near the white outlet. When in position, contacts 53 and 54 make connection to an electrically operated constant rate dispenser 55. The hue control lines from FIG. 11 actuate a hue indicator 56 which indicates the hue to be brought into position. These control lines also connect to a switch 57 which is actuated by movable structure 52 to energize interlock relay 58 when the proper hue is in position. With the interlock relay energized, depression of operate button 59 energizes the variable rate dispenser 50 and the constant rate dispenser 55 of the selected hue for as long as the button is depressed, the rate of dispenser 50, as determined by which of the whiteness control lines is energized, being such as to give the required chromaticity.

I claim:

1. An automatic paint mixer for matching the color of a luminous surface, comprising: a photoelectric system receiving light from said luminous surface and having X, Y and Z output signals supplied by X, Y and Z photoelectric sensors having sensitivities that are functions of wavelength substantially corresponding to the spectral distribution curves of the three color sensors of the eye; means for adding the X, Y and Z signals to produce a sum signal M; means receiving said sum signal and said X signal for producing an $x'$ signal equal to the ratio $X/M$ and means receiving said sum signal and said Y signal for producing a $y'$ signal equal to the ratio $Y/M$; first and second cathode ray tubes each having two rectangularly related deflection circuits; means for applying said $x'$ signal to one deflection circuit in each tube and means for applying said $y'$ signal to the other deflection circuit in each tube; a plurality of electrically separate conductive surfaces on the beam side of the screen of said first tube, said conductive surfaces covering an area corresponding to the area of realizable chromaticities in the CIE color plane with boundaries following lines of constant hue; a plurality of electrically separate conductive surfaces on the beam side of the screen of the said second tube, said conductive surfaces covering an area corresponding to the area of realizable chromaticities in CIE color plane with boundaries following lines of constant whiteness; a normally deenergized variable rate dispenser of white paint; a normally deenergized constant rate dispenser for each of as many hues as there are conductive surfaces on the screen of said first tube; a hue indicating device connected to the conductive surfaces of said first tube to indicate the conductive surface on which the beam is impinging; control circuits connected between the conductive surfaces of said second tube and said variable rate dispenser for controling its rate in accordance with the surface on which the beam of said tube is impinging; and means operable when the hue dispenser for the hue indicated by said hue indicator is in a predetermined dispensing position to simultaneously energize said variable rate white dispenser and the dispenser for said indicated hue.

References Cited
UNITED STATES PATENTS

| | | | |
|---|---|---|---|
| 3,088,479 | 5/1963 | Christie | 137—93 |
| 3,330,904 | 7/1967 | Gebel. | |

RONALD L. WIBERT, Primary Examiner

R. J. WEBSTER, Assistant Examiner

U.S. Cl. X.R.

178—5.2; 209—111.6; 356—176